Patented May 5, 1953

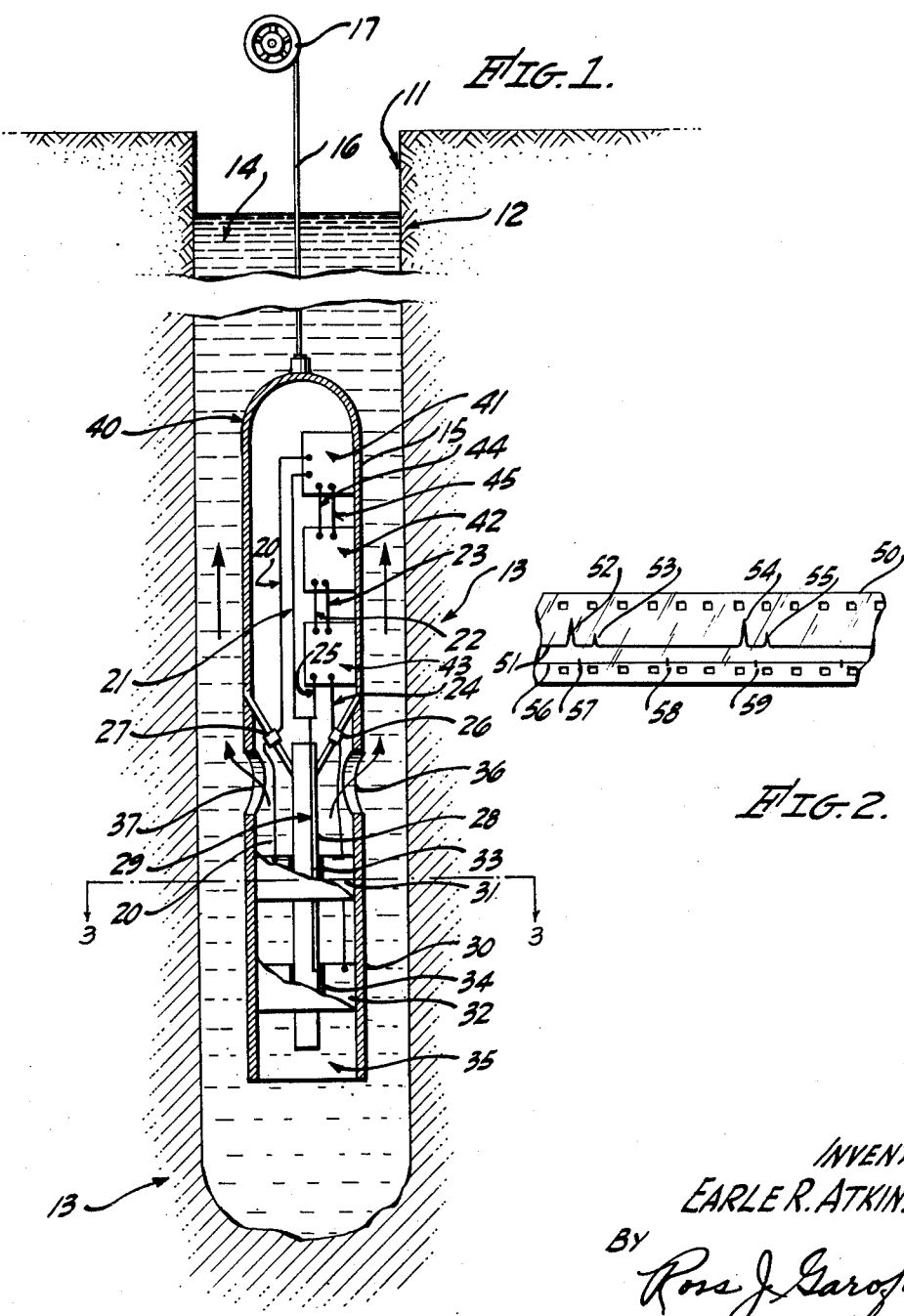

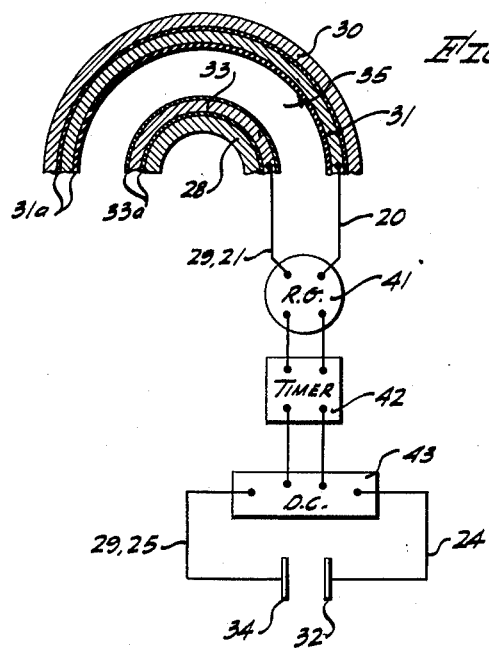
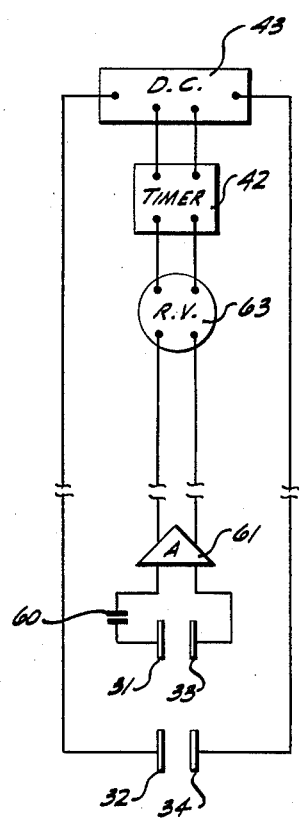
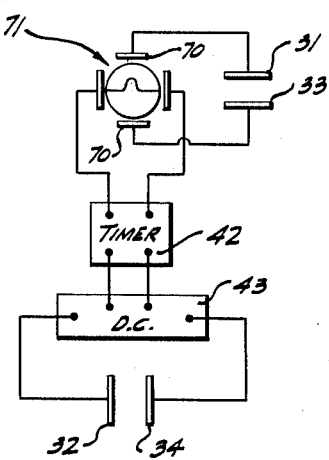

2,637,206

UNITED STATES PATENT OFFICE 2,637,206

FLOWMETER

Earle R. Atkins, Jr., La Habra, Calif., assignor to Union Oil Company of California, Los Angeles, Calif., a corporation of California Application October 13, 1949, Serial No. 121,166

3 Claims. (Cl. 73—155)

This invention relates generally to apparatus for measuring fluid flow, and more particularly to apparatus for measuring the flow of fluids, such as oil, within an oil well bore.

It is an object of this invention to impress an electrostatic charge upon an increment of flowing fluid and to time the arrival of the charged portion of the fluid at some particular downstream point by detecting the residual charge of the increment of fluid.

It is another object of this invention to measure the rate of flow in a flowing fluid by periodically impressing an electrostatic charge upon increments of the flowing stream and detecting the arrivals of the charged increments at a downstream location.

Attached Figure 1 presents one embodiment of the invention wherein a flowmeter unit is lowered into a well bore filled with fluid to determine the influent fluid rate.

Attached Figure 2 presents a photographic record of the data obtained with embodiment of the invention shown in Figure 1 from which record the fluid flow may be calculated.

Figure 3 presents a fragmentary cross section of the flowmeter taken along line 3—3 of Figure 1, showing the detector electrodes and their association with the electrical elements of Figure 1.

Figure 4 is a diagrammatic representation showing an alternative arrangement for the flowmeter units.

Figure 5 shows another alternative arrangement of flowmeter units employing an oscilloscope as the current detecting mechanism.

Briefly this invention relates to a new method for the determination of the rate of fluid flow wherein at least a part of the flowing stream to be measured is passed between two charging electrodes which are connected to a source of electric potential thereby charging an increment of the flowing fluid with an electrostatic charge. As a result of the normal flow of the fluid the charged increment is transported downstreamwardly whence it passes between two detecting electrodes which are fitted with suitable means for determining the arrival of the charged increment by detecting its residual electrostatic charge. Suitable means are also provided for determining the lapsed time interval between the charging and detecting steps, which interval determines the velocity of the fluid between the two sets of electrodes. The flow rate of the fluid is then determined from calibrations of the equipment or calculations from the fluid velocity.

In one embodiment of the invention the flowmeter is used to determine the rate of influent into a well bore such as an oil well bore. In a particular modification of the well bore flowmeter a flowmeter unit is suspended by a supporting cable and lowered into the liquid filled bore hole. The flowmeter unit itself comprises two parts viz. an upper enclosed sealed section and a lower non-sealed section open to the fluid flow. The sealed section contains a means for generating a high electrical potential, a means for pulsing such electrical potential whereby periodic pulses of relatively short duration and of low periodic frequency are obtained and means for recording the deflections of a galvanometer such as by recording the relative times of such deflections by the marking of a moving strip of photographic film with a movable illuminating device. The lower non-sealed section comprises a tubular section having a lower open end and suitable holes near the top. A suitable intervening passageway permits the relatively free ingress of fluid in the bottom and egress of fluid through the holes at the top. Near the bottom of the non-sealed section there are positioned two charging electrodes, viz. an inner and an outer cylindrical shaped charging electrode. The outer is supported from the tubular section and the inner is supported by an inner electrode support coaxial to the tubular section. A fluid passageway passes through the annular space between the electrodes. A short distance above the charging electrode and below the fluid egress holes are two detecting electrodes which correspond structurally to the charging electrodes.

At such time as the potential is applied to the electrodes from the high potential generator or source the increment of the flowing stream passing through the charging electrode, annular space at that instant acquires an electrostatic charge. After a momentary charging period the timer shuts off the current flow. The normal flow of the fluid causes the charged portion of the liquid to pass upwardly through the chamber whence it passes between the two detector electrodes. The arrival of the fluid carrying the electrostatic charge within the annular space of the detecting electrodes causes a charge to be set up between the two detecting electrodes which, when conveyed through suitable conductors to the recording galvanometer, causes a deflection. The recording galvanometer record film is marked at the instant the charge is applied to the charging electrodes and when the charged liquid is detected in the detector electrode as well as at some definite time interval such as at the end of each second. The lapsed time interval between the charging and detecting steps is thusly determined. This lapsed time interval is the fluid transit time to move the liquid the average distance between the two sets of electrodes. The fluid velocity determined by such time interval and distance also determines the fluid flow rate in a given size pipe for a particular instrument.

Referring now more particularly to attached Figures 1 and 3, bore hole 11 is completed through various miscellaneous formations 12 into oil bearing formation 13. Oil flowing from oil bearing formation 13 fills bore hole 11 the upper liquid level being indicated at 14 and such flowing oil is removed from the bore hole by suitable means not shown. Flowmeter unit 15 is suspended in the proximity of the oil bearing formation 13 by means of supporting cable 16 attached to and wound on winding drum 17. Winding drum 17 is also fitted with suitable depth of instrument indicating means not shown. Flowmeter unit 15 is composed of sealed, upper, liquid-tight section 40 which encloses high voltage source 43, high voltage source timer 42 and recording galvanometer 41.

High voltage direct current source 43 is any suitable source. In one form it comprises a means for interrupting a direct current source from batteries to produce an interrupted current which is then applied to a suitable transformer to produce high voltage alternating current. The alternating current is then rectified and filtered by means of a filter condenser to produce the desired high voltage. High voltage timer 42 comprises any suitable, mechanical or electrical means for pulsing the flow of the high voltage current from high voltage source 43 to produce momentary direct current flows of short duration, each of which flows is considerably spaced from the preceding and succeeding current flows. Timer 42 is connected to high voltage source 43 by means of conductors 22 and 23 respectively.

The recording galvanometer 41 shown in Figures 1 and 3 comprises any suitable type for recording the deflections of the galvanometer such that the time interval between such deflections can be determined. In one embodiment such record may be produced upon a strip of photographic film, as shown in Figure 2, which is caused to unwind slowly past one and preferably two light sources. The one light source is modulated by any suitable timing device such that time marks are indicated upon the film at periodic intervals such as the end of each second, at the end of each minute, etc. The same or preferably a second light source is modulated by any suitable method to indicate the instant which timer 42 causes a high voltage current to flow from high voltage source 43 and also to indicate the deflection of the galvanometer resulting from the charging of the detector electrodes described hereinabove.

The lower section of flowmeter unit 15 consists of a tubular section 30 coaxially attached to sealed section 40. The lower section is open at its lower end 35 to permit the ingress of fluid and has two holes 36 and 37 at its upper end which permit the egress of fluid. Coaxially mounted within the tubular section 30 is sealed electrode support 28, the upper end of which connects with the inner chamber of sealed unit 40 and is supported therefrom. A charging electrode section is contained in the lower open section and consists of cylindrical outer charging electrode 32 mounted coaxially within the tubular section 30, and inner charging electrode 34 mounted on electrode support 28 and coaxially within the outer cylindrical electrode 32. The annular space between the outer and inner charging electrodes, 32 and 34 respectively, provides a path for the upwardly flowing fluid. Above the charging electrode at a suitable distance therefrom, there are mounted two detecting electrodes, outer detecting electrode 31 and inner detecting electrode 33 respectively, which electrodes correspond structurally to the previously described charging electrode. In the preferred modification both the charging and the detecting electrodes are covered with a thin film of an electrically non-conductive material such as a polymerized methyl acrylate. This insulation is indicated at 31a and 33a in Figure 3. The film, or other such covering, insulates the electrodes from actual physical contact with the flowing liquid and increases the electrical resistance between the respective pairs of electrodes.

The outer charging electrode is connected with high voltage source 43 by means of line 24 which passes through the wall of the sealed section at sealed insulator 26. The inner charging electrode is connected to the outer terminal of the high voltage charging source 43 through lines 29 and 25. Outer detecting electrode 31 is connected to one terminal of recording galvanometer 41 by line 20 which passes into the sealed section through sealed insulator 27. Inner detecting electrode 33 is connected by means of lines 29 and 21 to the other terminal of the recording galvanometer 41.

Timer 42 is connected to high potential source 43 through lines 22 and 23 and causes the high potential from source 43 to be momentarily connected with the charging electrodes and thereafter disconnected until the time of the next periodic charging cycle.

Timer 42 is also connected to recording galvanometer 41 by means of leads 44 and 45 respectively. Whenever the charging potential is applied to the charging electrodes by the action of the timer 42, the timer also sends a small current to cause the deflection of the galvanometer at the same instant to mark the charging time upon the film record.

In the operation of the equipment the flowmeter unit 15 is positioned at some fixed point within bore hole 11 where the flow is to be measured. A part of the upwardly flowing fluid flows through open end 35 of tubular unit through the annular space between the inner and outer charging electrodes 32 and 34 respectively. Timer 42 causes a momentary connection of high voltage source 43 with the charging electrodes at some time during the flow whereby a difference of potential is set up between the inner and outer electrodes, 32 and 34 respectively, thereby imparting an electrostatic charge to the increment of flowing fluid in the annular space therebetween. At the same instant the timer 42 passes a small current to the recording galvanometer to mark the record at the time of the charging of the increments of the fluid. The normal flow of fluid causes the transfer of the charged increment of fluid upwardly through the tube whence it enters the detecting electrode section. Entry of the charged fluid in the annular space between inner and outer detecting electrodes, 31 and 33 respectively, causes a charge to be imparted to the electrodes which is conveyed to recording galvanometer 41 thereby causing a suitable deflection thereof. After leaving the detecting electrodes 31 and 33, the fluid passes out through holes 36 and 37 and flows upwardly in the bore hole past the flowmeter unit.

After the flowmeter unit has been withdrawn from the bore hole and the galvanometer photographic film removed and developed there is obtained a record of the type shown in Figure 2. Line 56 is produced by the timing light with traces 57, 58 and 59 marking a unit time interval such as minutes, seconds, tenths of seconds, or other such time measure. Line 51 represents the galvanometer trace with major peaks 52 and 54 representing successive charging times and minor peaks 53 and 55 representing the arrivals of charged fluid between the detector electrodes. The lapsed time interval between peaks 52 and 53 is the time for the fluid to travel from the charging electrode to the detecting electrode, which for a given spacing of the electrodes fixes the velocity of the fluid in the chamber. Such velocity is then related by empirical calibration to the velocity of the fluid generally, from which data the rate of flow can be calculated.

*Example*

A particular well is suspected of having a leaky casing at point A above the producing zone. The casing has an inner diameter of about 6 inches and 120 barrels/day of crude oil are being removed from the well at the earth surface. A flowmeter of the type described herein is placed in the well bore above point A and the oil flowing therethrough is charged periodically with a voltage of 300 volts for about 0.001 sec. The charged oil is detected by the detecting electrode on the average of about 2.1 seconds later. The vertical distance from the midpoint of the charging electrode to the midpoint of the detecting electrode is 1.0 inch. Where the oil flows at the rate of 1 inch per 2.1 seconds in a 6 inch casing the flow rate is 126 barrels/day. Thus the instrument's blocking a part of the oil flow causes a velocity increase of the oil flowing through the instrument by about 4%.

The instrument is then lowered to a point between point A and the producing zone. Using the same charging potential and charging time, the charged oil is detected about 1.9 seconds after the charging potential is applied. The oil flow rate at this point is $$\frac{2.1}{1.9} \times 120 = 133 \ B./D.$$

Thus since 133 B./D. are flowing from the producing zone and only 120 B./D. are being produced at the earth surface, about 13 B./D. are being lost from the casing near point A.

The foregoing description of this invention has been specifically directed to the case where the entire power supply, timing unit, and recording equipment are lowered in a single unit in conjunction with the charging and detecting electrodes. Although the foregoing modification is generally preferable, it is apparent however that it is not the only one which may be employed. For example, as indicated in Figure 4, the power supply and timer 42 could be located at the surface and the charging current transmitted down a conductor cable to the charging electrodes 32 and 34. Instead of recording galvanometer deflections at the location of the flowmeter, the detector electrodes 31 and 33 in series with a fixed capacitance 60 could be applied as an input to a Loften-White type D.-C. amplifier 61. The output of the amplifier could be passed through suitable conductor leads to the earth surface and employed to operate a recording voltmeter 63. In this latter case the charging time and suitable time marks would be marked upon the record analogous to the case of the photographic film. The determination of fluid flow from the record is exactly analogous to that previously described for the galvanometer record.

While the foregoing applications of this invention have been specifically directed to the measurement of oil flow within a well bore, it is apparent that the invention may be similarly employed to measure oil flow within a pipe, such as a pipe line, by merely placing a pair of charging electrodes and a pair of detecting electrodes within a suitably insulated section of pipe. The invention may be similarly employed to measure the flow of fluids other than oil such as those which have low dielectric constants, such as those which have dielectric constants of less than 20 and preferably less than 15. The flow of liquids which have higher dielectric constants and which have low conductivity can also be measured.

In certain cases the recording of the galvanometer deflections is difficult or even impossible such as where the fluid flow is extremely rapid or where the charging and detecting electrodes are very close together. In such cases, as indicated in Figure 5, the electrical impulses from the detecting electrodes 31 and 33 can be supplied to the vertical deflection plates 70 of an oscilloscope 71 where the horizontal sweep frequency of the oscilloscope is made to correspond to, and is identical to, that of the timer 42. The time interval between charging and detecting impulses can be determined directly from the horizontal displacement between the pulses on the oscilloscope. If it is desired, the particular instrument can be so calibrated for given size pipe such that the flow rate is determined directly from the horizontal displacement of the pulses on the oscilloscope tube.

While the foregoing description of this invention is based upon the use of a periodic charging of the fluid to form a series of charged increments in the flowing stream, each being detected before the formation of the next, it is apparent that a single charging step can be employed if desired. The lapsed time interval between the single charging and its detection can be used to determine a single value for the flow rate. The multiple charging is important in such cases where the timing is effected by means of an oscilloscope or where the flow rate is changing and it is desired to measure such changes.

While the foregoing description of this invention relates to the determination by an instrument at a particular fixed level, it is apparent that the flow measurements can be made with the instrument being raised or lowered in the bore hole at a constant rate. In such cases a correction for the relative motion of the instrument with respect to the strata is made on the measured fluid velocity or flow rate.

It is apparent that many modifications of this invention may be made by those skilled in the art without departing from the spirit and scope of the following claims.

I claim:

1. An apparatus for the determination of liquid flow of a substantially non-ionizable liquid which apparatus comprises a pair of charging electrodes insulated from direct electrical contact with said liquid flow, generating means for generating a high voltage direct current, electrical conducting means for momentarily connecting said generating means with said pair of charging electrodes, a pair of detecting electrodes located downstreamwardly from said pair of charging electrodes, means for maintaining said pair of detecting electrodes downstreamwardly in fixed spatial relationship to said pair of charging electrodes, a continuous liquid passageway connecting said pair of charging electrodes with said pair of detecting electrodes and time interval measuring means electrically connected with said charging electrodes and said detecting electrodes for determining the lapsed time interval between the charging of said pair of charging electrodes and the detecting by said pair of detecting electrodes.

2. An apparatus for measuring liquid flow within a well bore which comprises a housing having a liquid passageway running therethrough, a pair of insulated charging electrodes mounted in said liquid passageway and insulated from direct electrical contact with said liquid passing therethrough, a pair of insulated detecting electrodes mounted in said liquid passageway which are insulated to prevent direct electrical contact with said liquid passing therethrough, said insulated detecting electrodes being mounted a fixed distance above said insulated charging electrodes, electrical current producing means for producing a high voltage direct current, means for momentarily connecting said electrical current producing means to said pair of charging electrodes for electrostatically charging a portion of said liquid flowing between said charging electrodes, means for supporting said housing within said well bore at different levels, and a time interval measuring means electrically connected with said charging electrodes and said detecting electrodes for determining the lapsed time interval between said momentary charging and the subsequent detecting of the residual electrostatic charge on arrival between said pair of detecting electrodes.

3. An apparatus for determining the flow rate of a substantially non-ionizable liquid which apparatus comprises a flow-conducting means for flowing said liquid from a first location to a second location downstreamwardly a fixed distance from said first location, a pair of charging electrodes fixed at said first location and insulated from direct electrical contact with said liquid flow, means for periodically supplying an electrical current to said charging electrodes for periodically establishing an electric field in an increment of said flowing liquid, a pair of detecting electrodes fixed at said second location, said charging electrodes and said detecting electrodes being normally submerged in said liquid, electrostatic field-detecting means connected across said detecting electrodes, and means electrically connecting said charging electrodes and said electrostatic field-detecting means for temporally correlating said periodic establishing of an electric field in said liquid increment with the detection thereof at said detecting electrodes.

EARLE R. ATKINS, Jr.

References Cited in the file of this patent

UNITED STATES PATENTS

| Number | Name | Date |
| --- | --- | --- |
| 1,411,796 | Meyer | Apr. 4, 1922 |
| 1,440,778 | Foster | Jan. 2, 1923 |
| 1,611,502 | Allen | Dec. 21, 1926 |
| 1,616,481 | Allen | Feb. 8, 1927 |
| 1,808,709 | Blake | June 2, 1931 |
| 2,333,164 | Fisher | Nov. 2, 1943 |
| 2,353,382 | Barrett | July 11, 1944 |
| 2,453,456 | Piety | Nov. 9, 1948 |

FOREIGN PATENTS

| Number | Country | Date |
| --- | --- | --- |
| 615,769 | Great Britain | Jan. 11, 1949 |